United States Patent
Khasnabish

(10) Patent No.: US 9,112,880 B2
(45) Date of Patent: Aug. 18, 2015

(54) METHOD AND SYSTEM FOR IMPLEMENTING INTEGRATED VOICE OVER INTERNET PROTOCOL IN A CLOUD-BASED NETWORK

(75) Inventor: Bhumip Khasnabish, Lexington, MA (US)

(73) Assignees: ZTE Corporation, Shenzhen (CN); ZTE (USA) Inc., Richardson, TX (US)

(*) Notice: Subject to any disclaimer, the term of this patent is extended or adjusted under 35 U.S.C. 154(b) by 73 days.

(21) Appl. No.: 13/577,021

(22) PCT Filed: Feb. 15, 2011

(86) PCT No.: PCT/US2011/024901
§ 371 (c)(1),
(2), (4) Date: Sep. 13, 2012

(87) PCT Pub. No.: WO2011/100744
PCT Pub. Date: Aug. 18, 2011

(65) Prior Publication Data
US 2013/0003537 A1 Jan. 3, 2013

Related U.S. Application Data

(60) Provisional application No. 61/304,642, filed on Feb. 15, 2010.

(51) Int. Cl.
*H04L 12/28* (2006.01)
*H04L 29/06* (2006.01)

(52) U.S. Cl.
CPC .......... *H04L 65/105* (2013.01); *H04L 65/1053* (2013.01)

(58) Field of Classification Search
None
See application file for complete search history.

(56) References Cited

U.S. PATENT DOCUMENTS

| | | | |
|---|---|---|---|
| 6,496,477 B1 | 12/2002 | Perkins et al. | |
| 7,123,598 B1 | 10/2006 | Chaskar | |
| 7,418,092 B2 | 8/2008 | Brown | |
| 2002/0178269 A1* | 11/2002 | Suckow | 709/228 |
| 2004/0006615 A1* | 1/2004 | Jackson | 709/223 |
| 2005/0027788 A1* | 2/2005 | Koopmans et al. | 709/200 |
| 2005/0091399 A1* | 4/2005 | Candan et al. | 709/238 |
| 2006/0007914 A1* | 1/2006 | Chandra et al. | 370/352 |
| 2006/0026288 A1* | 2/2006 | Acharya et al. | 709/227 |
| 2006/0123470 A1* | 6/2006 | Chen | 726/5 |
| 2007/0140262 A1* | 6/2007 | Wang | 370/395.52 |
| 2008/0091811 A1* | 4/2008 | Wing et al. | 709/223 |

* cited by examiner

*Primary Examiner* — Kevin C Harper
(74) *Attorney, Agent, or Firm* — Drinker Biddle & Reath LLP

(57) ABSTRACT

A system for implementing VoIP over a cloud-based network includes a first edge proxy server operatively connected to a plurality of target proxy servers to receive resource information from one or more of the target proxy servers. Each target proxy server is associated with the cloud-based network. A first endpoint is operatively connected to the first edge proxy server and is configured for voice communications with a second endpoint. The voice communications are facilitated by the first edge proxy server using the received resource information.

7 Claims, 1 Drawing Sheet

METHOD AND SYSTEM FOR IMPLEMENTING INTEGRATED VOICE OVER INTERNET PROTOCOL IN A CLOUD-BASED NETWORK

PRIORITY

Priority is claimed to U.S. Provisional Patent Application No. 60/304,642, filed Feb. 15, 2010, the disclosure of which is incorporated herein by reference in its entirety.

FIELD OF THE INVENTION

The field of the present invention is cloud-based communication networks, particularly cloud-based networks in which sessions may be established and controlled from a software-based or hardware-based communication terminal.

BACKGROUND

By way of non-limiting example only, a cloud-based system refers to a network of connected computing and communication resources. A cloud-based system may represent a packet-switched network, like the Internet. The network may contain transmission lines, repeaters, routers, network backbones, network interconnect points, etc., depending upon the extent of the network which it represents. Voice over Internet Protocol ("VoIP") is a general term for a family of transmission technologies for delivery of voice communications over Internet Protocol ("IP") networks such as the Internet or other packet-switched networks.

When establishing a VoIP session over a traditional Time Division Multiplex ("TDM") or IP based communication system, a client or endpoint (irrespective of whether it is hardware or software based) configures and registers itself with a specific service or provider. For example, a Skype™ user downloads a Skype™ client on a laptop or on a phone, and registers for the services. A TDM based system uses an E.164 based phone number to make a phone call. However, if a service does not exist for any reason (e.g. overload, disaster, etc.), a VoIP session may not be established.

Accordingly, there is a need to support computing and communications services using the available resources of a cloud-based system without any significant investments for building and maintenance of networks, storage, servers, network management, operations, and provisioning systems.

SUMMARY OF THE INVENTION

The present invention is directed toward systems and methods for establishing and controlling a session over cloud-based networks from a software or hardware based communication terminal.

In a first aspect of the present invention, a system for implementing VoIP over a cloud-based network comprises a first edge proxy server operatively connected to target servers, and receives resource information from the target servers, which are associated with the cloud-based network. A first endpoint is operatively connected to the first edge proxy server and is configured for voice communications with a second endpoint over the cloud-based network. The system also includes a second endpoint operatively connected to a second edge proxy server. The first and second endpoints are configured for voice communications over the cloud-based network. The voice communications are facilitated by the first edge proxy server using the received resource information.

In a second aspect of the present invention, a first edge proxy server receives resource information from one or more target proxy servers associated with a cloud-based network, wherein the first edge proxy server is registered with a first endpoint. Based at least in part on the received resource information, the first edge proxy server facilitates voice communications with a second endpoint over the cloud based network.

Any of the above aspects may be implemented alone or in combination.

Additional aspects and advantages of the improvements will appear from the description of the preferred embodiment.

BRIEF DESCRIPTION OF THE DRAWINGS

Embodiments of the present invention are illustrated by way of the accompanying drawings, in which.

DETAILED DESCRIPTION OF THE PREFERRED EMBODIMENTS

Figure 1:
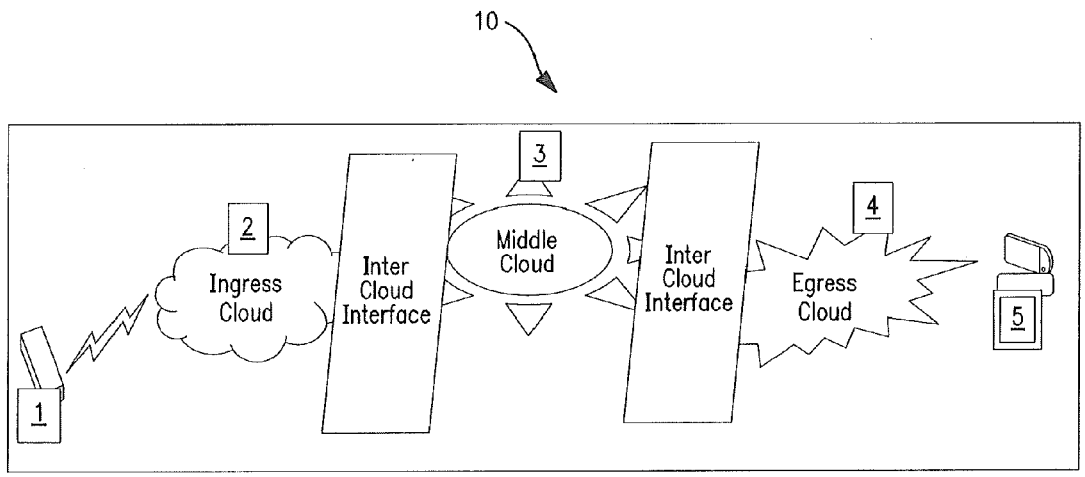
FIG. 1 illustrates a block diagram of an integrated VoIP over cloud-based network in which a session may be controlled from a communication terminal.

Referring now to FIG. 1, there is shown a block diagram of a system 10. The illustrated system 10 includes iVoCS ("integrated VoIP over Cloud-based System") endpoints 1 and 5, an ingress edge proxy server (not shown) located in an ingress cloud 2, a target proxy server (not shown) located in a middle cloud 3, and an egress edge proxy server (not shown) located in an egress cloud 4. An iVoCS endpoint, as used herein, refers to a particular contact point, an associated VoIP device, and a unique VoIP client identifier. The contact point refers to, for example, an individual, organization, or company. The edge proxy servers may include middleware. The middleware keeps track of the best possible server for the desired service, and frequently downloads information about the server's availability to endpoints of the system. For example, every minute (or any other predetermined time interval), the middleware downloads information about the server's availability, loading condition, and other characteristics to the endpoints. In the event the endpoints are powered down, the edge proxy servers update the endpoints with the server information when the endpoints are subsequently powered up.

Inter-cloud interfaces facilitate exchanges of resources and the resource availability information to and/or from all the clouds, 2, 3, and 4, of which they are attached. If the middle cloud 3 belongs to an administrative domain as the respective inter-cloud interface, the inter-cloud interfaces will be null. However, if the middle cloud 3 belongs to a different administrative domain; security, policy, and load balancing features must be properly managed across the inter-cloud interfaces. For purposes of non-limiting explanation only, an administrative domain refers to a network domain having authority to manage or control users with internal components of that domain.

For non-limiting purposes of explanation only, a "computer", as referred to herein, refers to a general purpose computing device that includes a processor. "Processor", as used herein, refers generally to a device including a Central Processing Unit ("CPU"), such as a microprocessor. A CPU generally includes an arithmetic logic unit ("ALU"), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips. Memory may take the form of one or more random-access memory ("RAM"), read-only memory ("ROM"), programmable read-only memory ("PROM"), erasable programmable read-only memory ("EPROM"), or electrically erasable programmable read-only memory ("EEPROM") chips. Memory may be internal or external to an integrated unit including the processor. Memory may be internal or external to the computer. Such memory may store a computer program, e.g., code or a sequence of instructions being operable by the processor. Such a computer may include one or more data inputs. Such a computer may include one or more data outputs. The code stored in memory may cause the processor, when executed by the processor, to set an output to a value responsive to a sensed input.

One type of computer executable code typically stored in memory so as to be executable by an Internet enabled computer is a browser application. For non-limiting purposes of explanation only, "browser" as used herein generally refers to computer executable code used to locate and display web pages. Two commercially available browsers are Microsoft Internet Explorer, Netscape Navigator, Apple Safari and Firefox, which all support text, graphics and multimedia information, including sound and video (sometimes through browser plug-in applications).

"Server", as used herein, generally refers to a computing device communicatively coupled to a network and that manages network resources. A server may refer to a discrete computing device, or may refer to an application that is managing resources rather than the entire computing device. An edge proxy server may be a proxy server which is designed to run at the edge of the network, e.g., separating a local network from the Internet.

Figure 2:
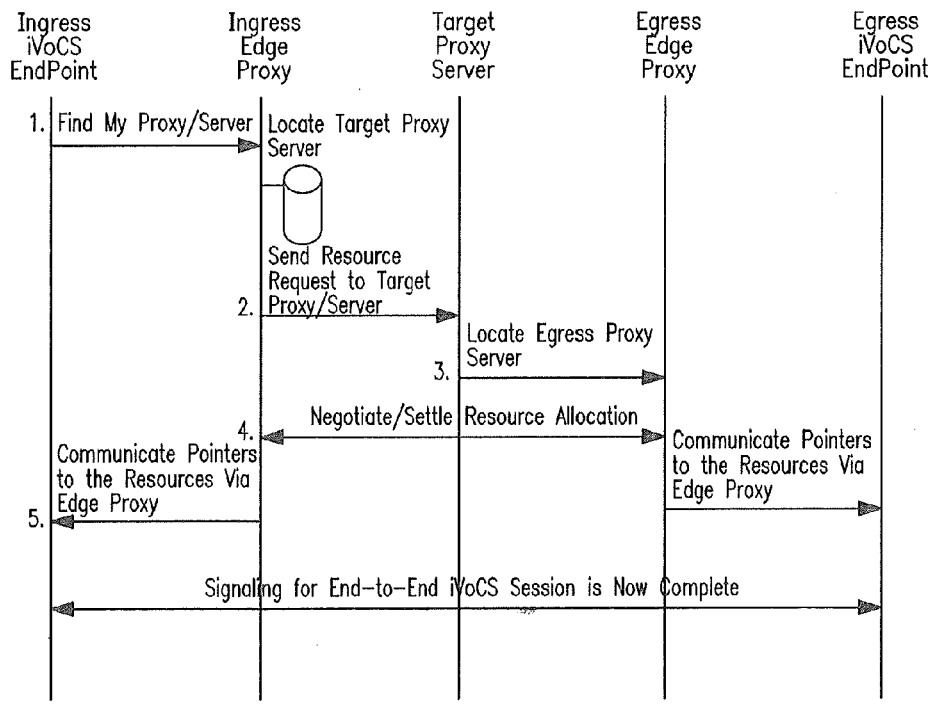
FIG. 2 illustrates a signaling method for establishing a session in an integrated VoIP over cloud-based network.

Referring now to FIG. 2, there is shown a diagram illustrating the steps of a signaling method for establishing an iVoCS session. In step 1, ingress and egress iVoCS endpoints establish communication with ingress and egress edge proxy servers, respectively, for session and non-session based services. In step 2, the ingress edge proxy server locates a target proxy server. In step 3, the ingress edge proxy server locates, via the target proxy server, the egress edge proxy server. In step 4, both the ingress edge proxy server and the egress edge proxy server identify the most feasible resources for requested sessions, and then finalize the resource allocation. The ingress and egress edge proxies also identify and assign resources in a middle cloud. In step 5, the ingress and egress edge proxies communicate the resource information to the iVoCS endpoints. A resource list is continuously monitored, and overloaded resources are relinquished if/when required. Media paths, translation and routing paths, if/when desired may be established in a similar fashion as the steps described above. Sub-application and sub-session layer inter-cloud resource allocation and communications may also follow methods as described in FIG. 2.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method for establishing a VoIP over a cloud-based network (iVoCS), said method comprising the steps of
   establishing communication between an ingress iVoCs endpoint, an engress iVoCS endpoint, an ingress edge proxy server and an egress edge proxy server,
   the ingress edge proxy server locates a target proxy server,
   the ingress edge proxy server locates the egress edge proxy server by way of the target proxy server,
   the ingress edge proxy server and the egress edge proxy server identify most feasible resources for one or more requested sessions and finalize a resource allocation,
   the ingress edge proxy server and the egress edge proxy server identify and assign one or more resources in a middle cloud, and
   the ingress edge proxy server and the egress edge proxy server communicate resource information on the resource allocation, the resources in the middle cloud, or both the resource allocation and the resources in the middle cloud, to the ingress iVoCS endpoint and the egress iVoCS endpoint.

2. The method of claim 1, further comprising:
   identifying. by the first edge proxy server, network resources in the cloud-based network using the received resource information, wherein the first edge proxy server facilitates voice communication between the ingress iVoCS endpoint and the egress iVoCS endpoint using the identified network resources.

3. The method of claim 1, further comprising:
   establishing voice communication between the ingress iVoCS endpoint and the engress iVoCs endpoint.

4. The method of claim 1, further comprising:
   receiving, at the second edge proxy server, resource information; and
   facilitating, by the second edge proxy server, voice communications, wherein the second edge proxy server is operatively connected to the second iVoCs endpoint.

5. The method of claim 4, further comprising:
   identifying, by the first and second edge proxy servers, network resources for the voice communications.

6. The method of claim 1, further comprising monitoring a resource list.

7. The method of claim 1, further comprising relinquishing overloaded resources.

* * * * *